US008989204B2

(12) United States Patent
Wang et al.

(10) Patent No.: US 8,989,204 B2
(45) Date of Patent: Mar. 24, 2015

(54) COMMUNICATION METHOD AND DEVICE OF BROADCAST AND/OR MULTICAST IN RADIO NETWORK

(75) Inventors: He Wang, Shanghai (CN); Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 81 days.

(21) Appl. No.: 13/266,746

(22) PCT Filed: Apr. 28, 2009

(86) PCT No.: PCT/CN2009/000459
§ 371 (c)(1),
(2), (4) Date: Oct. 27, 2011

(87) PCT Pub. No.: WO2010/124415
PCT Pub. Date: Nov. 4, 2010

(65) Prior Publication Data
US 2012/0044851 A1 Feb. 23, 2012

(51) Int. Cl.
*H04J 3/26* (2006.01)
*H04W 72/00* (2009.01)
*H04W 4/12* (2009.01)
(52) U.S. Cl.
CPC .............. *H04W 72/005* (2013.01); *H04W 4/12* (2013.01)
USPC ........... 370/432; 370/431; 370/437; 370/464; 370/465; 370/468
(58) Field of Classification Search
USPC .............. 370/229, 235, 236–236.2, 252, 310, 370/312, 328–330, 335–337, 342, 345, 370/347–348, 350, 431–432, 437, 441–444, 370/464–465, 468, 498, 503, 509–513, 522
See application file for complete search history.

(56) References Cited

U.S. PATENT DOCUMENTS

| 7,620,061 | B2 | 11/2009 | Yi et al. |
| 2009/0011698 | A1 | 1/2009 | Yang et al. |
| 2010/0110960 | A1 | 5/2010 | Kim et al. |

(Continued)

FOREIGN PATENT DOCUMENTS

| CN | 1697511 A | 11/2005 |
| CN | 101064562 A | 10/2007 |

(Continued)

OTHER PUBLICATIONS

International Search Report for PCT/CN2009/000459 dated Feb. 4, 2010.

(Continued)

*Primary Examiner* — Awet Haile
*Assistant Examiner* — Eric Myers
(74) *Attorney, Agent, or Firm* — Fay Sharpe LLP

(57) ABSTRACT

The invention discloses a communication method and device of broadcast and/or multicast in radio network. The eNB determines dynamic scheduling control information of each service, according to the practical transmission of the broadcast and/or multicast service in one scheduling period, and provides, in a MAC packet data unit, the UE with the dynamic scheduling control information; the UE receives, in a MAC packet data unit, the dynamic scheduling control information, and receives the broadcast and/or multicast service data from the eNB in the scheduling period, according to the dynamic scheduling control information.

15 Claims, 3 Drawing Sheets

(56) References Cited

U.S. PATENT DOCUMENTS

| | | | |
|---|---|---|---|
| 2011/0013554 A1* | 1/2011 | Koskinen | 370/315 |
| 2011/0021224 A1* | 1/2011 | Koskinen et al. | 455/507 |
| 2011/0103290 A1 | 5/2011 | Suzuki et al. | |

FOREIGN PATENT DOCUMENTS

| | | |
|---|---|---|
| CN | 101189902 A | 5/2008 |
| CN | 10 272518 A | 8/2008 |
| CN | 101340618 A | 1/2009 |
| CN | 101500311 A | 8/2009 |
| CN | 101541045 A | 9/2009 |
| CN | 101640843 A | 2/2010 |
| EP | 1887828 A1 | 2/2008 |
| JP | 2008-136245 | 6/2008 |
| KR | 20008 0086384 | 9/2008 |
| WO | WO 2009/157443 | 12/2009 |

OTHER PUBLICATIONS

Alcatel-Lucent, "E-MBMS dynamic scheduling information for MTCH," 3GGP TSG RAN WG2 #60bis, R2-080203, Jan. 18, 2008.

Nokia Corporation, Nokia Siemens Networks, "MAC in multi-cell and single-cell MBMS," 3GPP TSG RAN WG2 Meeting #61, R2-080698, Feb. 15, 2008.

Panasonic, "MBMS scheduling information and padding occasion relating to MBSFN subframe allocation," 3GPP TSG RAN WG2 #61, R2-080875, Feb. 14, 2008.

Nokia Corporation, Nokia Siemens Networks, "Providing dynamic MBMS scheduling information," 3GPP TSG RAN WG2 Meeting #61, R2-080694, Feb. 15, 2008.

Alcatel-Lucent, Shanghai Bell, Alcatel-Lucent, "MAC PDU design for eMBMS scheduling," 3GPP TSG RAN WG 2 #66, R2-093093, May 8, 2009.

Samsung, "REL-9 MBMS solution," 3GGP TSG RAN2 #65bis, R2-92209, Mar. 23-27, 2009, Seoul, South Korea.

* cited by examiner

COMMUNICATION METHOD AND DEVICE OF BROADCAST AND/OR MULTICAST IN RADIO NETWORK

TECHNICAL FIELD

The invention relates to radio communication networks, and particularly to communication method and device for performing broadcast and/or multicast in radio network.

BACKGROUND OF THE ARTS

Currently, broadcast and/or multicast service such as enhanced Multimedia Broadcast Multicast Service (eMBMS for short) is employed more and more widely in radio communication network. RP-090350 in LTE Release 9 requires that Multimedia Broadcast Multicast service Single Frequency Network (MBSFN for short) can provide good support for MBMS service. Each Evolved Universal Mobile Telecommunications System Terrestrial Radio Access Network (eNB) cell in the same MBSFN region uses the same time/frequency resource to send MBMS service, so as to make the service signal of each cell overlap with each other on the air, thereby providing UEs with the radio frequency (RF) combining gain and facilitating its reception and extraction of the MBMS service data.

Statistical Multiplexing (SM for short) can be carried out for different MBMS service with the same Quality of Service (QoS); these services can be transmitted in one MCH (multicast channel). Services that can be statistically multiplexed are defined as a "Service Bundle". A single service, not statistically multiplexed, can be seen as a service bundle containing only one service. And one service bundle can be seen as one service during scheduling.

Currently, the multicast coordination entity (MCE) in the network determines a semi-static MCH Subframe Allocation Pattern (MSAP for short) for each service, according to the QoS of the service. The MSAP determines the maximum resource occupation of each service in each period. On the other hand, the MCE also determines the transmission priority and MCS for each service according to the QoS of the service. In the practical system, however, the number of the subframes practically occupied by the service might be smaller than the predefined number of subframes in the MSAP allocated by the MCE. Therefore, in order to better utilize the subframes not being practically occupied and improve resource utilization, the radio system can carry out dynamic MAC layer scheduling for the amount of resources, namely the number of subframes occupied by data transmission in each scheduling period, according to the real-time fluctuation of eMBMS service data; the granularity of scheduling takes one subframe as its unit. This real-time processing can be done via MAC dynamic scheduling in each scheduling period. For supporting statistical multiplexing and improving radio resource utilization, the services in statistical multiplexing are transmitted continuously. Padding is only added to the last subframe of each MCH in the scheduling period. The remaining subframes, those not being practically occupied by MBMS services transmissions and discovered after the scheduling, can be used for other services such as unicast.

FIG. 1 shows one example of MBMS dynamic scheduling based on MSAP. For example, where, #0, #4, #5 and #9 subframes of each frame need to be used for transmitting control information such as paging information and system information, the standard specifies that #0, #4, #5 and #9 subframes can not be defined as MBSFN transmission subframes. Thus, in this case, the system determines the MBSFN subframes as #1, #2 and #3 subframes in each frame. Meanwhile, the system determines that the previous 10 radio frames of each scheduling period can be used for carrying MBSFN subframes. This means that, the total number of subframes for MSAP during a scheduling period of 320 ms is 30. In this case, the subframe occupations for MSAP are the MBSFN subframes in consecutive several frames starting from the first frame.

There are 3 services S1, S2 and S3 participating the SM. These 3 services constitute a service bundle {S1, S2, S3}. The MCE calculates 8 subframes for this service bundle according to the QoS and service amount of the three services, and its occupations are the subframes #1, #2 and #3 in first and second radio frame, and subframes #1 and #2 in the third radio frame, as shown in FIG. 1. The MCE predefines this allocation result in MSAP and provides each eNB and UE with it. However, since the practical data rate of each service fluctuates, as shown in FIG. 1, practical transmission of data of the three services only occupies 6.5 subframes (wherein S1 shown in backslash block occupies 2.5 subframes; S2 shown in square block occupies 3 subframes; and S3 shown in slash block occupies 1 subframe). Therefore, after the eNB carries out dynamic scheduling for the three services, the subframe not being practically used, shown in the dash block, can be spared. The eNB can allocate this subframe for services such as unicast. Padding is only added to the last subframe of each MCH in the scheduling period, as shown in the pipe block in FIG. 1.

Because the MBMS dynamic scheduling takes a longer time as its period, the eMBMS scheduling is different from the unicast scheduling: the MBMS scheduling has a higher real-time requirement than the unicast scheduling. Thus, for physical multicast channel (PMCH), there is no dedicated control channel similar to the physical downlink control channel (PDCCH) for the physical downlink shared channel (PDSCH). Therefore, how to transmit to the UE the MBMS dynamic scheduling control information of each scheduling period, namely how to indicate to the UE the practical transmission of each service in each scheduling period, is a technical problem to be solved.

SUMMARY OF THE INVENTION

In LTE Release 8, the MAC (medium access control) layer is not specifically designed for eMBMS service. And, release 9 requires correct and efficient supports for the eMBMS, particularly requires the supports for the service multiplexing agreed in TS36.300, therefore, the MAC layer can be optimized for this, so as to provide UE with the MBMS dynamic scheduling control information of each scheduling period. To better address this technical requirement, according to one aspect of the invention, method is provided for, in a eNB of radio communication networks, for providing a UE with broadcast and/or multicast service, comprising the steps of: i. determining dynamic scheduling control information of each service, according to the practical transmission of the broadcast and/or multicast service in one scheduling period; ii. providing, in a MAC packet data unit, the UE with the dynamic scheduling control information; and iii. transmitting the broadcast and/or multicast service data to the UE in the scheduling period.

According to another aspect of the invention, method is provided for, in a UE of radio communication networks, for receiving broadcast and/or multicast service from a eNB, comprising the following steps of: I. receiving, in a MAC packet data unit, dynamic scheduling control information of the broadcast and/or multicast to service for one scheduling period, from the eNB, the dynamic scheduling control information indicating the practical transmission of service data within the scheduling period; II. receiving the broadcast and/or multicast service data from the eNB in the scheduling period, according to the dynamic scheduling control information.

According to a third aspect of the invention, it is provided a device, in a eNB of radio communication networks, for providing a UE with broadcast and/or multicast service, comprising: i. a determining means, for determining dynamic scheduling control information of each service, according to the practical transmission of the broadcast and/or multicast service in one scheduling period; ii. a first providing means, for providing, in a MAC packet data unit, the UE with the dynamic scheduling control information; and iii. a transmitter, for transmitting the broadcast and/or multicast service data to the UE in the scheduling period.

According to a fourth aspect of the invention, it is provided a device, in a UE of radio communication networks, for receiving broadcast and/or multicast service from an eNB, comprising: a first obtaining means, for receiving, in a MAC packet data unit, dynamic scheduling control information of the broadcast and/or multicast service for one scheduling period, from the eNB, the dynamic scheduling control information indicating the practical transmission of service data within the scheduling period; a receiver, for receiving the broadcast and/or multicast service data from the eNB in the scheduling period, according to the dynamic scheduling control information. Preferably, the dynamic scheduling control information comprises the serial number of the practical ending subframe, of the transmission of the service in the scheduling period, in multicast subframes of the scheduling period. The eNB transmits to the UE the information in the form of MAC CE, in the first subframe of each scheduling period, and preferably retransmits it within the scheduling period. The eNB also transmits to the UE multicast channel allocation pattern indicating the predefined starting subframe of the transmission of the service data in at least one scheduling period, as well as MBSFN subframe allocation information predefined for at least one scheduling period, such that the UE can determine the starting subframe and the ending subframe of the transmission of the service in the scheduling period and receive the service data from the eNB, during the corresponding subframes.

According to the invention, the dynamic scheduling control information for each scheduling period is communicated in the MAC layer, and the eNB can notify the UE with the result of the dynamic scheduling without extra out-band signaling indications. And the UE can obtain this scheduling result correctly, and receives service data correctly according to the scheduling result. Preferably, the dynamic scheduling control information comprises the serial number of the practical ending subframe, of the transmission of the service in the scheduling period, in multicast subframes of the scheduling period, thereby the length of the control information is short.

BRIEF DESCRIPTION OF THE DRAWINGS

By reading the detailed description of the non-restrictive embodiments by referring to the figures, other features, purposes and advantages of the present invention will become more apparent.

Throughout the figures, the same or similar reference sign stands for the same or similar component.

DETAILED EMBODIMENT OF THE INVENTION

In the embodiment of the invention, eNB and dominated UE in one radio MBSFN network carry out MBMS communication, and the communicated service may be one single service, one abovementioned SM comprising multiple services, or multiple SM with different QoS. Here, various cases are all called as the broadcast and/or multicast service communication.

Figure 1:
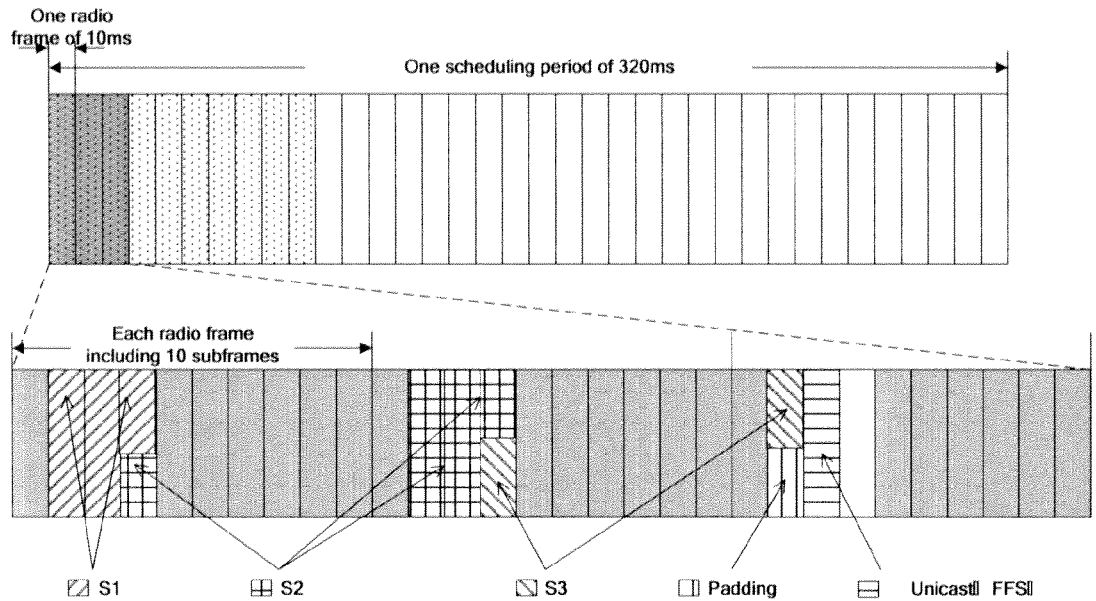
FIG. 1 is a schematic view of the eMBMS dynamic scheduling based on MSAP, in one scheduling period.
Figure 2:
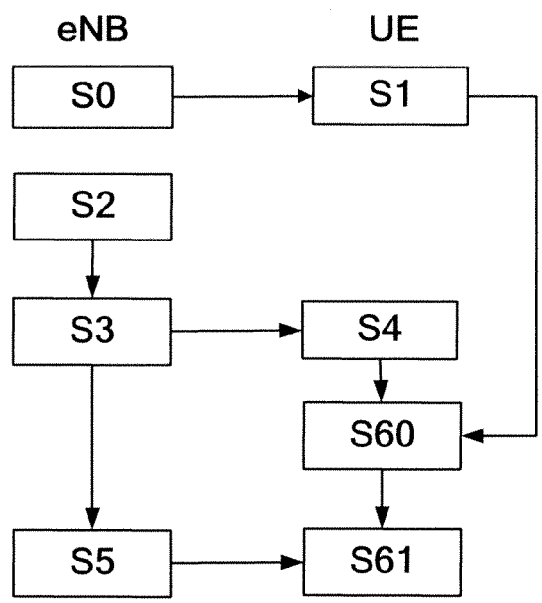
FIG. 2 is a flow chart of the method for the eNB and UE to carry out broadcast and/or multicast service communication, according to one embodiment of the invention.

In the embodiment, the scheduling period is still 320 ms. It can be understood that the present invention is also applicable for other lengths of scheduling periods such as 640 ms.

eMBMS dynamic scheduling based on MSAP in one scheduling period, described in FIG. 1 above, is still taken as an example. According to the QoS of the SM {S1, S2, S3} service, the MCE has already determined for the SM service a MCH Subframe Allocation Pattern (MSAP for short): the service occupies 8 subframes for transmission, with respect to each scheduling period including the present scheduling period. The MSAP indicates the predefined starting subfame of the transmission of the MBMS service, and the number of the occupied subframes.

First, the embodiment of the invention will be elucidated from the viewpoint of the system method, referring to FIG. 1 to FIG. 4.

According to the real-time fluctuation of the data amount of the eMBMS service data, the eNB determines the practical transmission of the service in the scheduling period: the SM constituted by the three services practically occupies 6.5 subframes, wherein S1 shown in backslash block occupies 2.5 subframes in total: subframes #1, #2 and #3 of the first frame; S2 shown in square block occupies 3 subframes in total: subframe #3 of the first frame and subframes #1, #2 and #3 of the second frame; and S3 shown in slash block occupies 1 subframe in total: subframe #3 of the second frame and subframe #1 of the third frame. Based on the predefined ending subframe of the transmission of the service data in the scheduling period, namely subframe #1 of the third frame, and the is practical ending subframe of the transmission of the service data in the scheduling period, namely subframe #2 of the third frame, the eNB re-allocated the subframes not being used for practical transmission, namely subframe #2 of the third frame to other service such as unicast. Technologies related to the dynamic scheduling are well known in the art, and the description will not give unnecessary details. In case the eNB and other eNBs belong to one MBSFN region, the eNB determines the practical transmission of the service in the scheduling period by using a content synchronization rule unified among the SFN.

Firstly, in step S2, the eNB determines dynamic scheduling control information of the service according to the SM, namely according to the practical transmission of the service in this scheduling period.

In one case, the dynamic scheduling control information is the serial numbers of subframes, occupied by the service, in all subframes of the scheduling period. In the scheduling period of 320 ms, there are 320 subframes in total. Thus the length of the serial number of each subframe takes up 9 bits, and 7 subframes of the transmission need a data amount of 63 bits, which is a relatively huge data amount. In another preferable case, the dynamic scheduling control information is information about the practical ending subframe of the transmission of the service data in the scheduling period, namely the subframe #1 of the third frame. In this case, in step S0, the eNB provides, via Radio Resource Control (RRC) signaling, the UE with the information about the predefined starting subframe of the transmission of the service data in at least one scheduling period including the present scheduling period, as well as the MBSFN subframe allocation information predefined for at least one scheduling period including the present scheduling period. Correspondingly, in step S1, the UE receives the information about the predefined starting subframe of the transmission as well as the MBSFN subframe allocation information. Wherein, the information about the predefined starting subframe of the transmission of the service data in at least one scheduling period including the present scheduling period is the abovementioned MSAP determined by the MCE; and the MBSFN subframe allocation information is determined by the MCE to indicate which subframes in each frame is used for MBMS service. The UE acquires subframes which are used for MBMS service based on the MBSFN subframe allocation information; and in turn it can determine the location of the starting subframe and the ending subframe in all subframes in the whole scheduling period, according to the information of the starting subframe and the ending subframe of transmission; after that, in case the MBMS transmission is consecutive, the UE acquires the starting subframe and the ending subframe of transmission, and MBMS subframes therebetween are the subframes used for transmitting this service. In case there are multiple MBMS service to transmit during one unified scheduling period, the eNB transmits to the UE the information about the practical ending subframe and predefined starting subframe respectively for each service. Additionally, the eNB also transmits to the UE the transmission order of these services, such that the UE can determine the practical ending subframe and predefined starting subframe of transmission respectively for each service.

In a preferred embodiment, the information about the practical ending subframe of transmission includes serial number of the practical ending subframe of the transmission in multicast subframes of the scheduling period. Since each frame has 6 subframes as the multicast subframes, namely the subframes except for #0, #4, #5 and #9, there are 192 multicast subframes in 320 ms. Thus, the length of the serial number of the practical ending subframe of the transmission in multicast subframes can be 8 bits. In this case, the data amount occupied by each dynamic scheduling control information is relatively small.

After that, in step S3, the eNB transmits to the UE the dynamic scheduling control information in the MAC-PDU, namely in the packet data unit of medium access control, without requiring extra out-band signaling.

The embodiment re-uses the format of MAC-PDU defined in section 6.2.1 of TS36.321, and this format is used for downlink synchronization channel (DL-SCH) and uplink synchronization channel (UL-SCH). In this format, the embodiment adds a new MAC CE to carry the dynamic scheduling control information, which is called as "MAC CE of MBMS dynamic scheduling control info".

The LCID (logical channel ID) related to MBMS is listed in the table below. The definitions of these IDs are just like definition for DL-SCH in Table 6.2.1-1 of TS36.321 and are compatible with DL-SCH.

TABLE 1

Values of LCID for MBMS related

| Index | LCID Values |
| --- | --- |
| 00000 | CCCH |
| 00001-01010 | Idenntity of the logical channel |
| 01011 | MCCH |
| 01100-11010 | Reserved |
| 11011 | MBMS scheduling info |
| 11100 | UE Contention Resolution Identity |
| 11101 | Timing Advance Command |
| 11110 | DRX Command |
| 11111 | Padding |

For MBMS, the LCID of MCCH can select "01011" from the reserved values of the standard. The LCID of "MAC CE of MBMS dynamic scheduling control info" can use the reserved value "11011" of the standard. All LCID related to the DL-SCH should be kept from being used by MBMS. However, the MCH of the MBMS service can share the LCID 00001-01010 of the DL-SCH.

Figure 3:
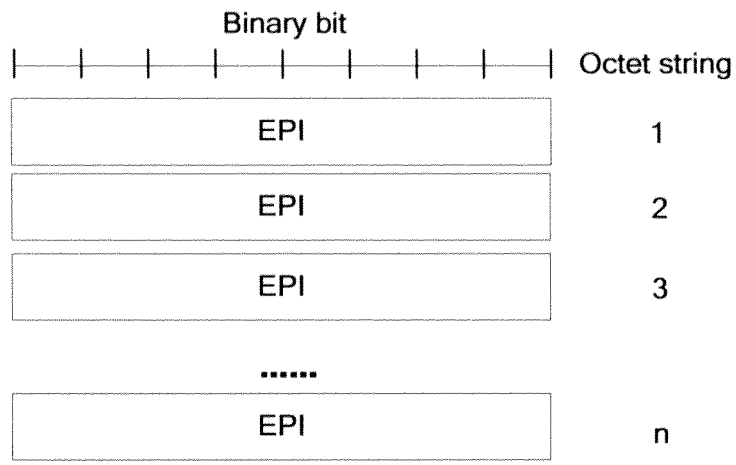
FIG. 3 is the structure of the eMBMS dynamic scheduling control information, communicated in the form of MAC CE, according to one embodiment of the invention.

The detailed "MAC CE of MBMS dynamic scheduling control info" can be defined as follows which is composed by one or more octet strings. Each octet string indicates the information about the ending subframe of transmission of one MBMS service in the present scheduling period, and the octet strings correspond to the MBMS services in a one-to-one way, and the order of the strings is the same as the order of the transmission of MBMS services determined by the MCE. It can be seen that the length of the CE is variable. FIG. 3 shows a frame structure of the MAC CE of MBMS dynamic scheduling control info, wherein the Ending Point Index (EPI) is used to indicate the information about the ending subframe of each service. In the preferred embodiment the information about the subframe of transmission is the serial number of the subframe in the multicast subframes of the scheduling period, the maximum EPI is 196 which can be denoted by a binary sequence in the length of one byte.

Figure 4:
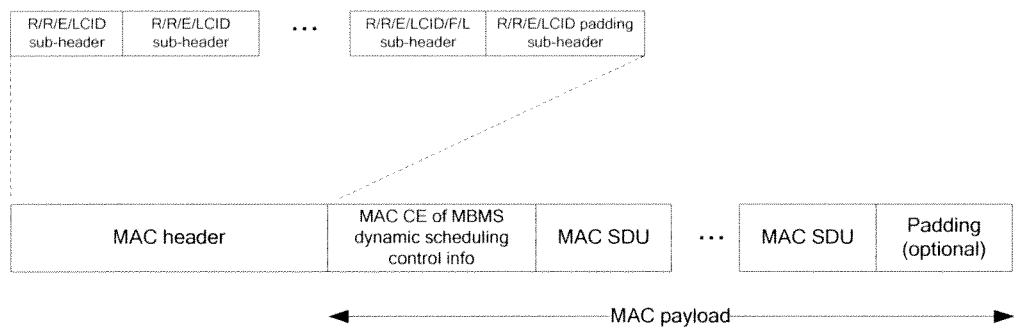
FIG. 4 is the frame structure of the MAC-PDU containing the MAC CE of MBMS dynamic scheduling control information, according to one embodiment of the invention.

Preferably, the eNB transmits to the UE the dynamic scheduling control information in the form of MAC CE, in the MAC-PDU in the first subframe of the scheduling period. The frame structure of this MAC-PDU is shown in FIG. 4, wherein the MAC header contains sub-headers corresponding to each MAC-SDU (service data unit) in the MAC payload; in the MAC payload, the MAC CE of MBMS dynamic scheduling control info is located in the first place, followed by the MAC-SDUs for each different logical channel. Besides transmitting the dynamic scheduling control information in the first subframe of the scheduling period, the eNB can re-transmit the MAC CE of MBMS dynamic scheduling control info within the scheduling period for at least once before the practical transmission of the service, so as to ensure the correct reception for the UE.

Then, in step S4, the UE receives from the eNB the dynamic scheduling control information of the broadcast service for the present scheduling period, in the MAC-PDU, wherein the dynamic scheduling control information indicates the practical transmission of the service data within the scheduling period. In case the eNB re-transmits the dynamic scheduling control information within the scheduling period before the practical transmission of the service, the UE re-receives the information.

Preferably, the dynamic scheduling control information is the serial number of the practical ending subframe of the transmission of the service data in the multicast subframes in the scheduling period.

Before that, in step S1, the UE has received information about the predefined starting subframe of transmission and the MBSFN subframe allocation information. Based on the abovementioned way, the UE can determine the number and locations of the MBSFN subframes of the MBMS service in the scheduling period. In step S60, the UE determines the starting subframe and the ending subframe of the transmission of the MBMS service in the scheduling period, according to the MBSFN subframe allocation information, on the basis of the received serial number of the practical ending subframe and information about the predefined starting subframe of transmission. Please refer to the description of the eNB side for the specific way of determining.

Then, in step S5, the eNB transmits to the UE the MBMS traffic data in the corresponding subframes in the scheduling period.

In step S61, the UE receives from the eNB the MBMS service data, from the determined starting subframe to the determined ending subframe of the transmission.

For each scheduling period, the eNB and the UE repeat the above steps. What is to be noted is, in the practical networks, since the MBMS subframe allocation information and the predefined starting subframe of transmission of service are semi-statically allocated by the MCE and keep unchanged for a relatively long time, the eNB can transmit to the UE the information about the predefined starting subframe of transmission and MBMS subframe allocation information in advance; and the UE stores this information without requiring the eNB to transmit it each time. Specifically, the above steps S0 and S1 can be spared.

The above elucidate the invention from the view point of method, and the following will give elucidation for the invention from the view point of device.

Figure 5:
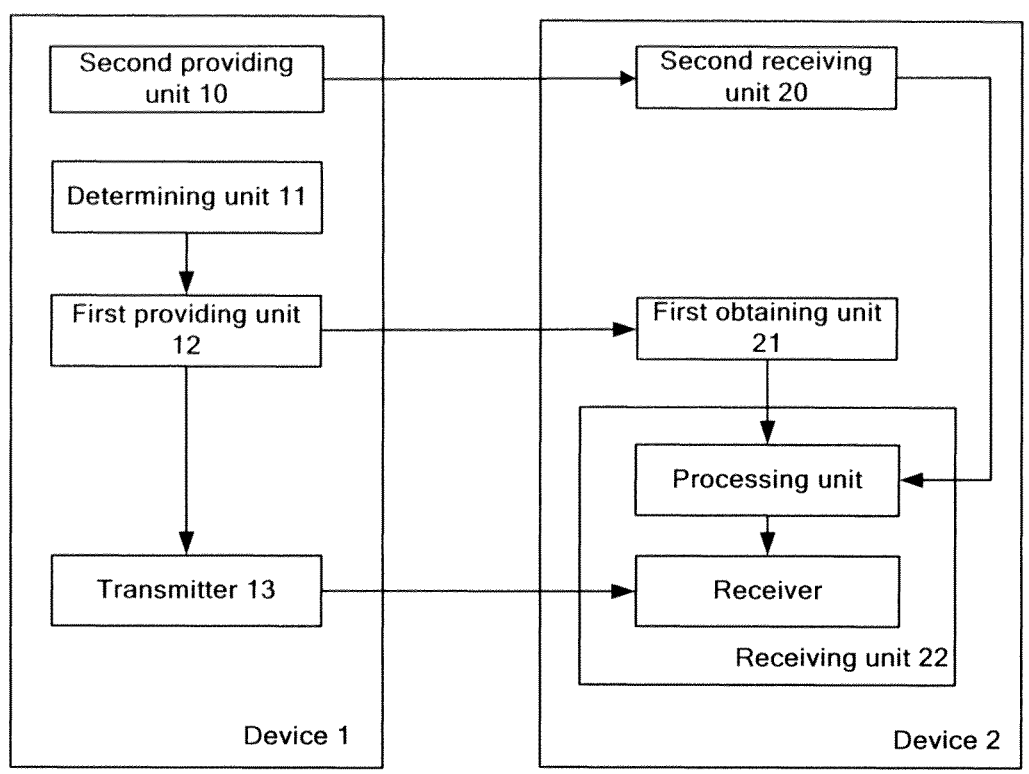
FIG. 5 is a block diagram of the devices in the eNB and UE to carry out broadcast and/or multicast service communication, according to another embodiment of the invention.

As shown in FIG. 5, the eNB comprises a device 1 for providing a UE with broadcast and/or multicast service. The device 1 comprises a determining unit 11, a first providing unit 12 and a transmitter 13, and preferably comprises a second providing unit 10, an allocating unit and a scheduling unit. The UE comprises a device 2 for receiving broadcast and/or multicast service from an eNB. The device 2 comprises a first obtaining unit 21 and a receiving unit 22, and preferably comprises a second obtaining unit 20.

According to the real-time fluctuation of the data amount of the eMBMS service data, the scheduling unit (not shown) of the eNB determines the practical transmission of the service in the scheduling period: as shown in FIG. 1, the SM constituted by the three services practically occupies 6.5 subframes, wherein S1 shown in backslash block occupies 2.5 subframes in total: subframes #1, #2 and #3 of the first frame; S2 shown in square block occupies 3 subframes in total: subframe #3 of the first frame and subframes #1, #2 and #3 of the second frame; and S3 shown in slash block occupies 1 subframe in total: subframe #3 of the second frame and subframe #1 of the third frame. Based on the predefined ending subframe of the transmission of the service data in the scheduling period, namely subframe #1 of the third frame, and the practical ending subframe of the transmission of the service data in the scheduling period, namely subframe #2 of the third frame, the processing unit (not shown) of the eNB re-allocates the subframes not being used for practical transmission, namely subframe #2 of the third frame to other service such as unicast. Technologies related to the dynamic scheduling are well known in the art, and the description will not give unnecessary details. In case the eNB and other eNBs belong to one MBSFN region, the scheduling unit determines the practical transmission of the service in the scheduling period by using a content synchronization rule unified among the SFN. Firstly, the determining unit 11 determines dynamic scheduling control information of the service according to the SM, namely according to the practical transmission of the service in this scheduling period.

Preferably, the dynamic scheduling control information is information about the practical ending subframe of the transmission of the service data in the scheduling period, namely the subframe #1 of the third frame. In this case, the second providing unit 10 provides, via Radio Resource Control (RRC) signaling, the UE with the information about the predefined starting subframe of the transmission of the service data in at least one scheduling period including the present scheduling period, as well as the MBSFN subframe allocation information predefined for at least one scheduling period including the present scheduling period. Correspondingly, the second obtaining unit 20 of the UE receives the information about the predefined starting subframe of the transmission as well as the MBSFN subframe allocation information. Wherein, the information about the predefined starting subframe of the transmission of the service data in at least one scheduling period including the present scheduling period is the abovementioned MSAP determined by the MCE; and the MBSFN subframe allocation information is determined by the MCE to indicate which subframes in each frame are used for MBMS service. The processing unit of the receiving unit 22 of the UE acquires the subframes which are used for MBMS service based on the MBSFN subframe allocation information; and in turn the processing unit can determine the location of the starting subframe and the ending subframe in all subframes in the whole scheduling period, according to the information of the starting subframe and the ending subframe of transmission; after that, in case the MBMS transmission is consecutive, the processing unit acquires the starting subframe and the ending subframe of transmission, and the MBMS subframes therebetween are the subframes used for transmitting this service. In case there are multiple MBMS service to transmit during one unified scheduling period, the eNB transmits to the UE the information about the practical ending subframe and predefined starting subframe respectively for each service. Additionally, the second providing unit 10 also transmits to the UE the transmission order of these services, such that the UE can determine the practical ending subframe and predefined starting subframe of transmission respectively for each service.

In a preferred embodiment, the information about the practical ending subframe of transmission includes serial number of the practical ending subframe of the transmission in multicast subframes of the scheduling period. Each frame has 6 subframes as the multicast subframes, namely the subframes except for #0, #4, #5 and #9; there are 192 multicast subframes in 320 ms. Thus, the length of the serial number of the practical ending subframe of the transmission in multicast subframes can be 8 bits. In this case, the data amount occupied by each dynamic scheduling control information is relatively small.

After that, the first providing unit 12 transmits to the UE the dynamic scheduling control information in the MAC-PDU, namely in the packet data unit of medium access control, without requiring extra out-band signaling.

The embodiment re-uses the format of MAC-PDU defined in section 6.2.1 of TS36.321, and adds a new MAC CE to carry the dynamic scheduling control information, which is called as "MAC CE of MBMS dynamic scheduling control info". Please refer to the elucidation in the previous method embodiment for the definitions of LCIDs (logical channel ID) related to MBMS, and unnecessary details will not be given here.

The "MAC CE of MBMS dynamic scheduling control info" can be composed by one or more octet strings. Each octet string indicates the information about the ending subframe of transmission of one MBMS service in the present scheduling period, and the octet strings correspond to the MBMS services in a one-to-one way. The order of the strings is the same as the order of the transmission of MBMS services determined by the MCE. It can be seen that the length of the CE is variable. FIG. 3 shows a frame structure of the MAC CE of MBMS dynamic scheduling control info, wherein the Ending Point Index (EPI) is used to indicate the information about the ending subframe of each service. In the preferred embodiment the information about the subframe of transmission is the serial number of the subframe in the multicast subframes of the scheduling period, the maximum EPI is 196 which can be denoted by a binary sequence in the length of one byte.

The first providing unit 12 transmits to the UE the dynamic scheduling control information in the form of MAC CE, in the MAC-PDU in the first subframe of the scheduling period. The frame structure of this MAC-PDU is shown in FIG. 4, wherein the MAC header contains sub-headers corresponding to each MAC-SDU (service data unit) in the MAC payload; in the MAC payload, the MAC CE of MBMS dynamic scheduling control info is located in the first place, followed by the MAC-SDUs for each different logical channel. Besides transmitting the dynamic scheduling control information in the first subframe of the scheduling period, the first providing unit 12 can re-transmit the MAC CE of MBMS dynamic scheduling control info within the scheduling period at least once before the practical transmission of the service, so as to ensure the correct reception for the UE.

Then, the first obtaining unit 21 of the UE receives from the eNB the dynamic scheduling control information of the broadcast service for the present scheduling period, in the MAC-PDU, wherein the dynamic scheduling control information indicates the practical transmission of the service data within the scheduling period. In case the eNB re-transmits the dynamic scheduling control information within the scheduling period before the practical transmission of the service, the UE re-receives the information.

Preferably, the dynamic scheduling control information is the serial number of the practical ending subframe of the transmission of the service data in the multicast subframes in the scheduling period.

Before that, the second obtaining unit 22 of the UE has received information about the predefined starting subframe of transmission and the MBSFN subframe allocation information.

The receiving unit 22 of the UE determines the starting subframe and the ending subframe of the transmission of the MBMS service in the scheduling period, according to the MBSFN subframe allocation information, on the basis of the received serial number of the practical ending subframe and information about the predefined starting subframe of transmission. Please refer to the description of the eNB side for the specific way of determining.

Then, the transmitter 13 transmits to the UE the MBMS traffic data in the corresponding subframes in the scheduling period.

After that, the receiver of the receiving unit 22 of the UE receives from the eNB the MBMS service data, from the determined starting subframe to the determined ending subframe of the transmission.

For each scheduling period, each unit of the eNB and the UE repeats operation. What is to be noted is, in the practical networks, since the MBMS subframe allocation information and the predefined starting subframe of transmission of service is semi-statically allocated by the MCE and remains unchanged for a relatively long time, the second providing unit 10 of the eNB can transmit to the UE the information about the predefined starting subframe of transmission and MBMS subframe allocation information in advance; and the UE stores this information without requiring the eNB to transmit it each time. Specifically, the above second providing unit 10 and the second obtaining unit 20 can be spared.

Above describes the embodiment of the present invention. It should be noted that the present invention is not limited to the specific embodiments mentioned above and that those skilled in the art are able to make various variations or modifications within the scope of the appended claims.

What is claimed is:

1. A method, in an eNB of radio communication networks, for providing a UE (User Equipment) with broadcast and multicast service, comprising:
    determining dynamic scheduling control information of each service, according to the practical transmission of the broadcast and multicast service in one scheduling period,
        wherein the dynamic scheduling control information comprises at least information about the practical ending subframe of the transmission of the service data in the scheduling period, wherein the information about the practical ending subframe of the transmission comprises the serial number of the practical ending subframe of the transmission in multicast subframes of the scheduling period, and
        wherein padding is added only to the last subframe of each multicast channel in the scheduling period, and
        wherein the remaining subframes not being practically occupied by Multimedia Broadcast Multicast Service services transmission, discovered after the scheduling, are used for other services;
    providing, in a MAC packet data unit, the UE with the dynamic scheduling control information; and
    transmitting the broadcast and multicast service data to the UE in the scheduling period.

2. A method according to claim 1, the method further comprises:
    providing the UE with information about the predefined starting subframe of the transmission of the service data in the scheduling period, as well as the MBSFN subframe allocation information predefined for at least one scheduling period.

3. A method according to claim 2, wherein:
    the information about the predefined starting subframe of the transmission comprises the multicast channel allocation pattern.

4. A method according to claim 1, further comprising:
    allocating subframes not being used for practical transmission to other services, according to the predefined ending subframe of the transmission of the service data in the scheduling period and the practical ending subframe of the transmission of the service data in the scheduling period.

5. A method according to claim 1, wherein the radio communication network is based on transmission mode of Multimedia Broadcast Multicast service Single Frequency Network (MBFSN) of LTE, and the method further comprises:
  determining the practical transmission of each service in the scheduling period, according to a content synchronization rule unified among each SFN belonging to the same region of MBSFN.

6. A method according to claim 1, further comprising:
  transmitting to the UE the dynamic scheduling control information in the form of MAC Control Element (MAC CE), in the first subframe of the scheduling period, and retransmitting it within the scheduling period,
  wherein all elements of claim 1 are repeated for every scheduling period.

7. A method according to claim 1, wherein the dynamic scheduling control information comprises at least the serial numbers of subframes, occupied by the service, in all subframes of the scheduling period.

8. A method, in a UE (User Equipment) of radio communication networks, for receiving broadcast and multicast service from an eNB, comprising:
  receiving from the eNB, in a MAC packet data unit, dynamic scheduling control information of the broadcast and multicast service for one scheduling period, the dynamic scheduling control information indicating the practical transmission of service data within the scheduling period,
  wherein the dynamic scheduling control information comprises at least information about the practical ending subframe of the transmission of the service data in the scheduling period, wherein the information about the practical ending subframe of the transmission comprises the serial number of the practical ending subframe of the transmission in multicast subframes of the scheduling period, and
  wherein padding is added only to the last subframe of each multicast channel in the scheduling period, and
  wherein the remaining subframes not being practically occupied by Multimedia Broadcast Multicast Service services transmission, discovered after the scheduling, are used for other services; and
  receiving the broadcast and multicast service data from the eNB in the scheduling period, according to the dynamic scheduling control information.

9. A method according to claim 8, wherein the dynamic scheduling control information comprises information about the practical ending subframe of the transmission of the service data in the scheduling period, and the method further comprises:
  receiving, from the eNB, information about the predefined starting subframe of the transmission of the service data in the scheduling period, as well as the MBSFN subframe allocation information predefined for at least one scheduling period; and
  wherein the process of receiving the broadcast and multicast service data from the eNB in the scheduling period, according to the dynamic scheduling control information, includes:
    determining the starting subframe and the ending subframe of the transmission of the broadcast and multicast service data in the scheduling period; and
    receiving, from the eNB, the broadcast and multicast service data, from the starting subframe to the ending subframe of the transmission.

10. A method according to claim 9, wherein the information about the practical ending subframe of the transmission comprises the serial number of the practical ending subframe of the transmission in multicast subframes of the scheduling period, the information about the predefined starting subframe of the transmission comprises the multicast channel allocation pattern, and determining the starting subframe and the ending subframe of the transmission of the broadcast and multicast service data in the scheduling period includes:
    determining the starting subframe and the ending subframe of the transmission of the broadcast and/or multicast service data in the scheduling period, according to the multicast channel allocation pattern and the serial number of the practical ending subframe of the transmission in multicast subframes of the scheduling period, on the basis of broadcast and multicast subframe allocation information.

11. A method according to claim 8, wherein the radio communication network is based on transmission mode of MBSFN of LTE.

12. A method according to claim 8, further comprising:
  receiving the dynamic scheduling control information in the form of MAC CE, in the first subframe of the scheduling period, and re-receiving it within the scheduling period,
  wherein all elements of claim 8 are repeated for every scheduling period.

13. A method according to claim 8, wherein the dynamic scheduling control information comprises at least the serial numbers of subframes, occupied by the service, in all subframes of the scheduling period.

14. A device, in an eNB of radio communication networks, for providing a UE with broadcast and multicast service, comprising:
  a determining unit, comprising at least a processor, configured to determine dynamic scheduling control information of each service, according to the practical transmission of the broadcast and multicast service in one scheduling period, wherein the dynamic scheduling control information comprises at least information about the practical ending subframe of the transmission of the service data in the scheduling period, wherein the information about the practical ending subframe of the transmission comprises the serial number of the practical ending subframe of the transmission in multicast subframes of the scheduling period, wherein padding is added only to the last subframe of each multicast channel in the scheduling period;
  a first providing unit, comprising at least a processor, configured to provide, in a MAC packet data unit, the UE with the dynamic scheduling control information; and a transmitter, for transmitting the broadcast and multicast service data to the UE in the scheduling period; and
  an allocating unit, comprising at least a processor, for reallocating subframes not being used for practical transmission to other services, according to the predefined ending subframe of the transmission of the service data in the scheduling period and the practical ending subframe of the transmission of the service data in the scheduling period.

15. A device, in a UE of radio communication networks, for receiving broadcast and multicast service from an eNB, comprising:
  a first obtaining unit, comprising at least a processor, configured to receive from the eNB, in a MAC packet data unit, dynamic scheduling control information of the broadcast and multicast service for one scheduling period, the dynamic scheduling control information indicating the practical transmission of service data within the scheduling period, wherein the dynamic scheduling control information comprises at least information about the practical ending subframe of the transmission of the service data in the scheduling period, wherein the information about the practical ending subframe of the transmission comprises the serial number of the practical ending subframe of the transmission in multicast subframes of the scheduling period, wherein, during practical transmission and dynamic scheduling, padding is added only to the last subframe of each multicast channel in the scheduling period, and wherein the remaining subframes not being practically occupied by Multimedia Broadcast Multicast Service services transmission, discovered after the scheduling, are used for other services;

a receiving unit, comprising at least a receiver, configured to receive the broadcast and multicast service data from the eNB in the scheduling period, according to the dynamic scheduling control information, wherein the receiving unit further comprises a processing unit, comprising at least a processor, for determining the starting subframe and the ending subframe of the transmission of the broadcast and multicast service in the scheduling period.

\* \* \* \* \*